(12) United States Patent
Chen

(10) Patent No.: US 7,894,850 B2
(45) Date of Patent: *Feb. 22, 2011

(54) PORTABLE ELECTRONIC DEVICE WITH MOVABLE SPEAKER DEVICE

(75) Inventor: Meng-Chun Chen, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 497 days.

This patent is subject to a terminal disclaimer.

(21) Appl. No.: 11/953,710

(22) Filed: Dec. 10, 2007

(65) Prior Publication Data

US 2009/0010479 A1    Jan. 8, 2009

(30) Foreign Application Priority Data

Jul. 4, 2007    (CN) .......................... 2007 1 0076378

(51) Int. Cl.
*H04M 1/00*    (2006.01)
(52) U.S. Cl. .................................... 455/550.1; 361/683
(58) Field of Classification Search ............. 455/550.1, 455/569.1, 575.1, 575.2, 575.3; 361/683
See application file for complete search history.

(56) References Cited

U.S. PATENT DOCUMENTS

| 5,319,519 | A | * | 6/1994 | Sheppard et al. | ........ 361/679.39 |
| 5,838,537 | A | * | 11/1998 | Lundgren et al. | ...... 361/679.27 |
| 6,181,550 | B1 | * | 1/2001 | Kim | ...................... 361/679.06 |
| 2004/0229662 | A1 | * | 11/2004 | Chadha | .................... 455/575.1 |
| 2006/0096064 | A1 | * | 5/2006 | Ma et al. | ....................... 16/303 |

* cited by examiner

*Primary Examiner*—Kent Chang
*Assistant Examiner*—Dinh P Nguyen
(74) *Attorney, Agent, or Firm*—Jeffrey T. Knapp

(57) ABSTRACT

A portable electronic device (100) includes a main body (10) having at least one cavity (131) defined therein, at least one speaker device (20) being movable received in the cavity of the main body, and at least one latching mechanism (30) movably attached to the main body. The speaker device has a resonant chamber (28) defined therein, and a positioning stop member (262) extending therefrom. Each resonant chamber communicates with a corresponding cavity. The at least one latching mechanism includes a latching body (31), and the latching body is configured for selectably engaging with the positioning stop member to enable control of movement of a corresponding speaker device relative to the main body.

10 Claims, 7 Drawing Sheets

PORTABLE ELECTRONIC DEVICE WITH MOVABLE SPEAKER DEVICE

CROSS-REFERENCE TO RELATED APPLICATION

This application is related to a co-pending U.S. patent application Ser. No. 11/777,069, entitled "PORTABLE ELECTRONIC DEVICE WITH MOVABLE SPEAKER", by Kuang-Hsien Wang. Such application has the same assignee as the present application and has been concurrently filed herewith. The disclosure of the above identified application is incorporated herein by reference.

BACKGROUND OF THE INVENTION

1. Technical field

The present invention relates to portable electronic devices and, particularly, to a portable electronic device configured (i.e., structured and arranged) for having at least one movable speaker device.

2. Description of Related Art

Nowadays, portable electronic devices such as mobile phones and PDAs (personal digital assistants) are in widespread use around the world. Some high-end portable electronic devices are being developed to be increasingly multifunctional. Many of these portable electronic devices are now equipped with a MP3 (i.e., Moving Picture Experts Group Audio Layer III, MPEG AudioLayer-3) module. These electronic devices can enable consumers to enjoy music almost anytime and anywhere.

A typically portable electronic device with a MP3 module has a single speaker device formed on one end thereof. The speaker device can be used for converting electrical signals from a phone call or music stored in the MP3 module into sounds and emits the sounds when the portable electronic device is set in a hands free mode. While playing music, the user may place the portable electronic device in a hand, in a bag, or on a desk. However, since the speaker device is incorporated inside the portable electronic device and the portable electronic device typically has a compact volume, the soundbox of such device also has a compact volume, which affects the bass performance thereof. In addition, the single speaker device can only emit sound in one direction, which lacks of stereo capability. Thus, single speaker device does not fully suit the use of the portable electronic device with an MP3 player as a stationary music player.

Therefore, an improved portable electronic device with at least one movable speaker device is desired in order to overcome the above-described problems.

SUMMARY

In one aspect thereof, a portable electronic device includes a main body having at least one cavity defined therein, at least one speaker device being movable received in the cavity of the main body, and at least one latching mechanism movably attached to the main body. The speaker device has a resonant chamber defined therein, and a positioning stop member extending therefrom. Each resonant chamber communicates with a corresponding cavity. The at least one latching mechanism includes a latching body, which is configured for selectively engaging with the positioning stop member to enable control of movement of a corresponding speaker device relative to the main body.

Other advantages and novel features of the embodiments will become more apparent from the following detailed description thereof, when taken in conjunction with the accompanying drawings.

BRIEF DESCRIPTION OF THE DRAWINGS

Many aspects of the present portable electronic device with a movable speaker device can be better understood with reference to the following drawings. The components in the drawings are not necessarily drawn to scale, the emphasis instead being placed upon clearly illustrating the principles of the present portable electronic device with a movable speaker device and its potential applications. Moreover, in the drawings, like reference numerals designate corresponding parts throughout the several views.

DETAILED DESCRIPTION OF THE EMBODIMENTS

Figure 1:
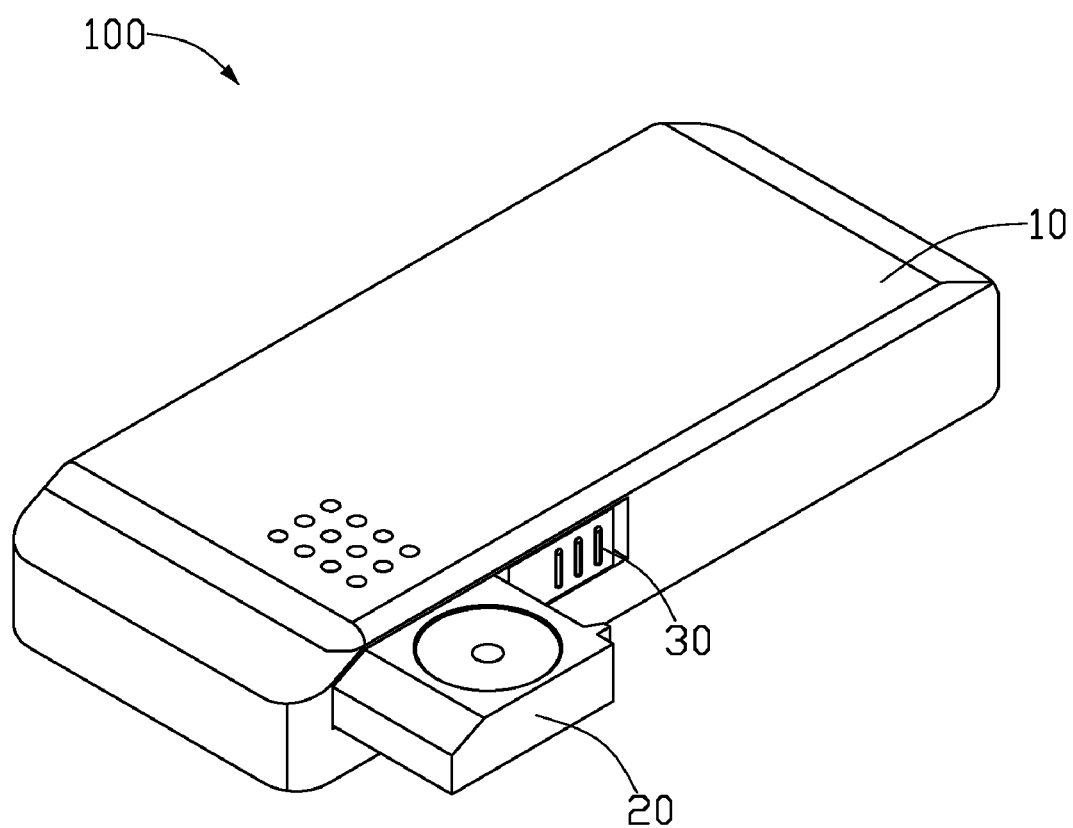
FIG. 1 is an assembled, isometric view of a portable electronic device in a speaker operational state, in accordance with a present embodiment.
Figure 2:
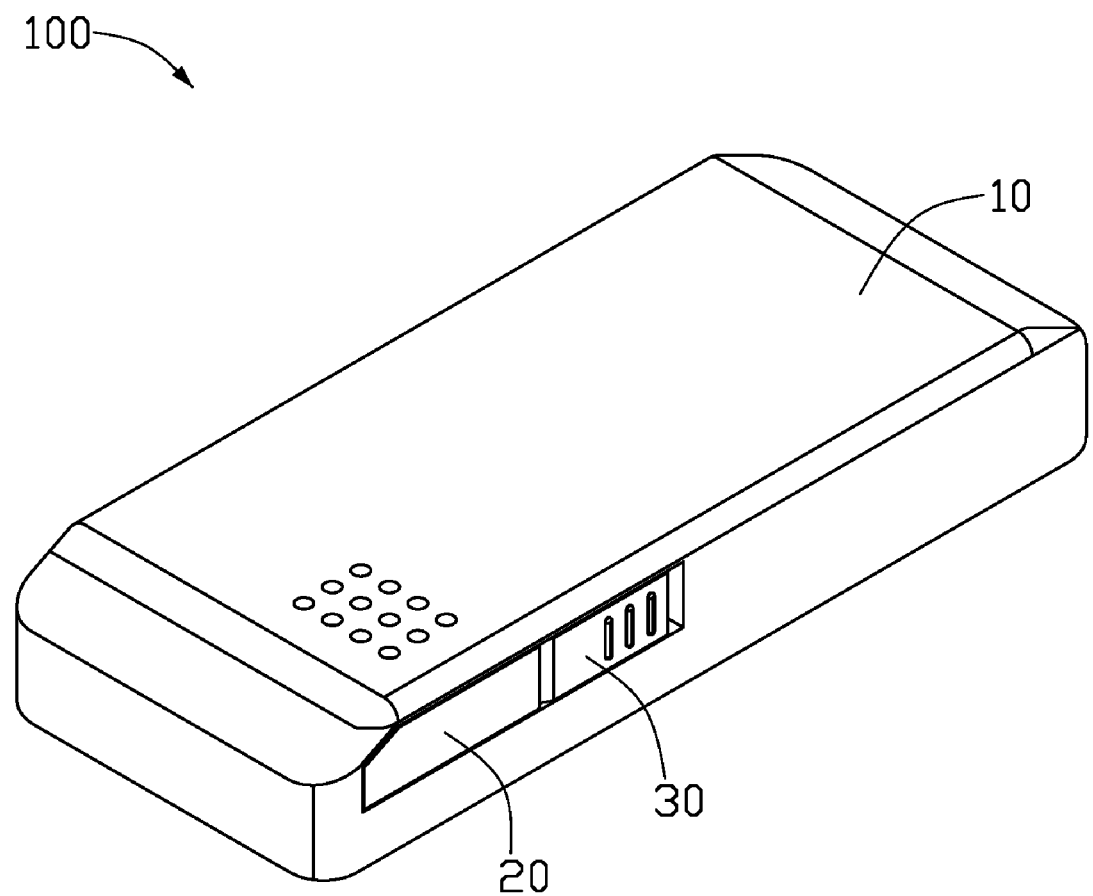
FIG. 2 is an assembled, isometric view of the portable electronic device of FIG. 1, shown in a speaker non-operational state.

Referring now to the drawings in detail, FIGS. 1 and 2 show a portable electronic device 100 including a main body 10, a speaker device 20, and a latching mechanism 30. The speaker device 20 is movably mounted to the main body 10 by the latching mechanism 30.

Figure 3:
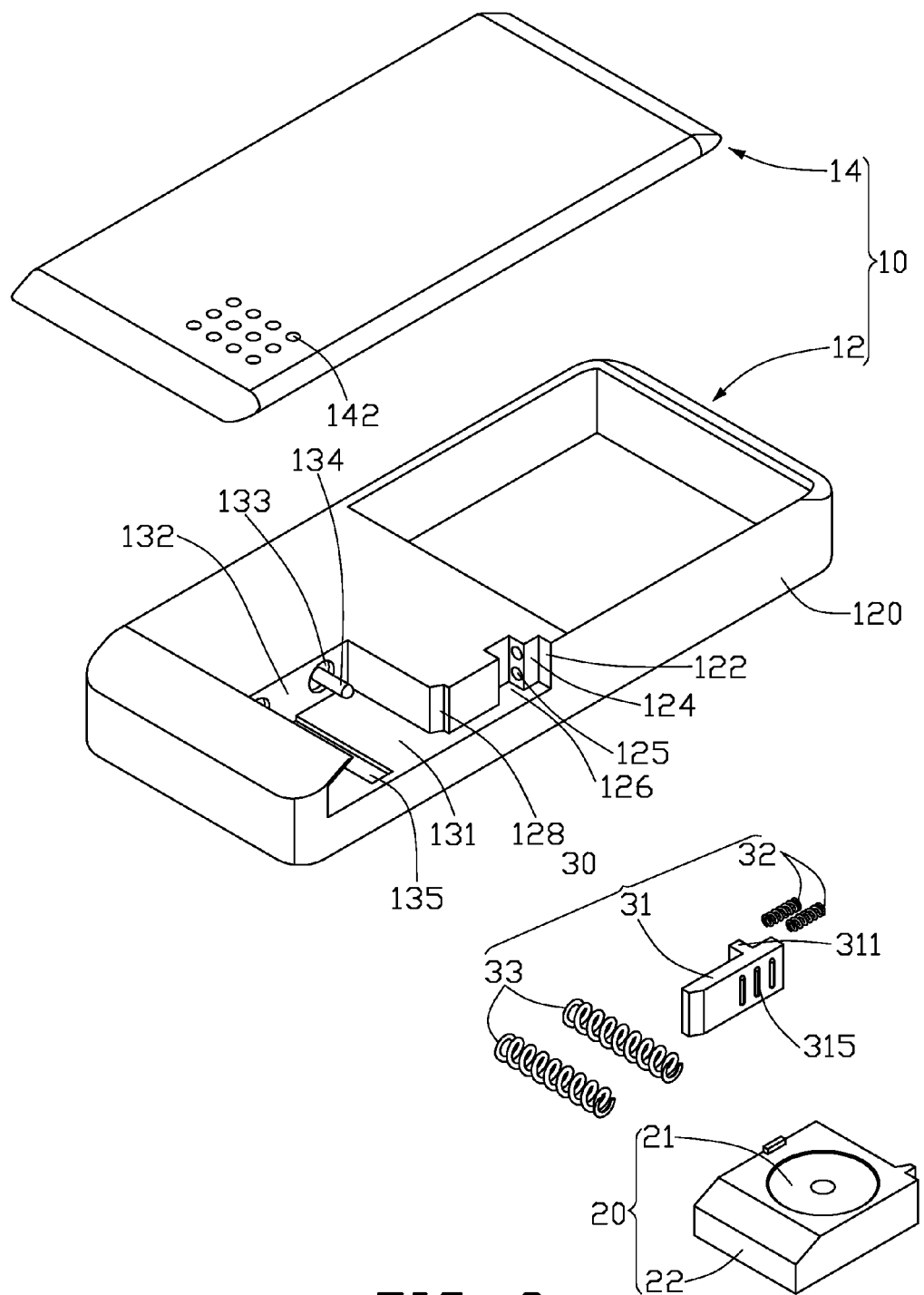
FIG. 3 is an exploded, isometric view of the portable electronic device, as shown in FIGS. 1 and 2.

Also referring to FIG. 3, the main body 10 is substantially a rectangular case, and has a housing 12 and a cover 14.

The housing 12 has a longitudinal side 120 which defines a groove 122 (i.e., an inner side surface), a slot 126, a cut out 128 and a cavity 131 defined in the longitudinal side 120. The slot 126 communicates with the groove 122, and thereby a step 124 is formed within the longitudinal side 120. The step 124 has two step positioning holes 125 defined therein, each communicating with the slot 126. The cavity 131 recesses inwardly from the longitudinal side 120 to the internal of the housing 12, and thereby an inner wall 132 is formed inside the cavity 131. The cavity 131 communicates with the groove 122. The inner wall 12 faces outwardly via the cavity 131. Two receiving holes 133 are defined in the inner wall 132. A first pole 134 is partially fixed inside the receiving hole 133 and partially extends out from the receiving hole 133 to the cavity 131. The housing 12 defines a first guiding slot 135 which communicates with the cavity 131, and extends from the inner wall 132 proximate to the longitudinal side 120. The housing 12 defines a cutout 128 communicating with the groove 122 and the cavity 131.

The cover 14 is attached to the housing 12, so as to receive electronic components such as printed circuit board, MP3 module, the speaker device 20 and etc. therein and protect the electronic components from being damaged by external force. The cover 14 has a pore matrix 142 defined therethrough, and a second guiding slot (not shown) defined therein. The pore matrix 142 is positioned corresponding to the speaker unit 21 of speaker device 20. The second guiding slot of the cover 14 is positioned corresponding to the guiding slot 135 of the housing 12.

Figure 4:
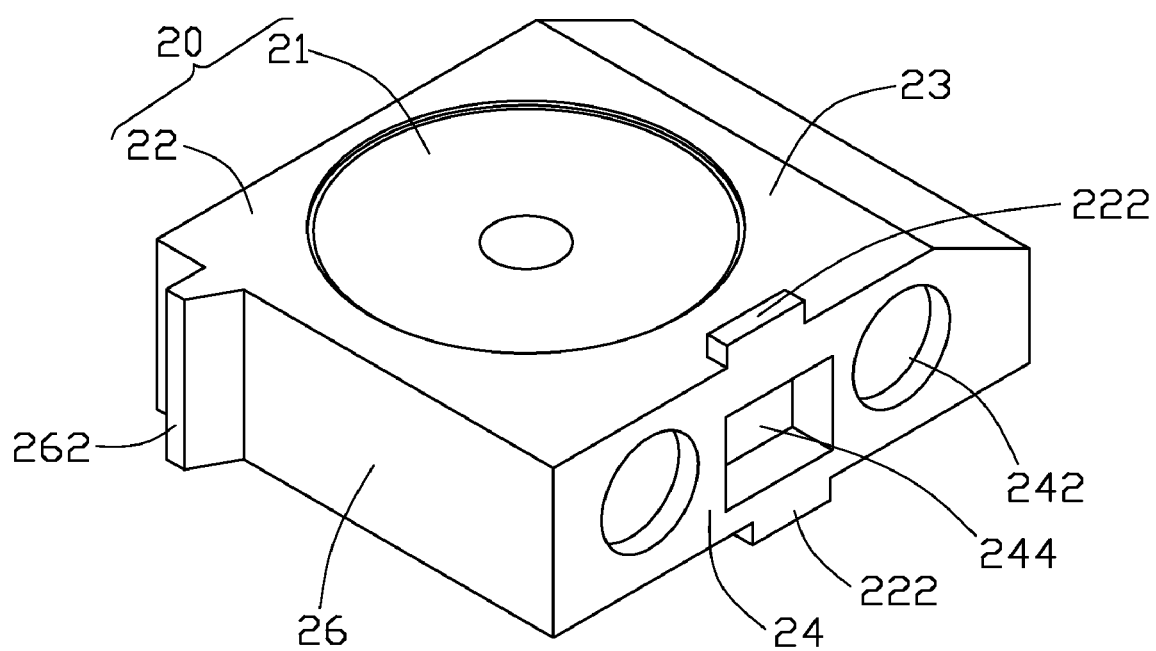
FIG. 4 shows an enlarged, isometric view of a soundbox of the speaker device of the portable electronic device, but viewed from another aspect.

Also referring to FIG. 4, the speaker device 20 includes a speaker unit 21 and a speaker box 22 which together are configured (i.e., structured and arranged) to be movably situated inside the cavity 131.

The speaker unit 21 receives electronic audio signals transmitted from an audio module received in the housing 12, converts the electronic audio signals into sounds, and emits the sounds. The speaker unit 21 is received and fixed in the speaker box 22.

Figure 6:
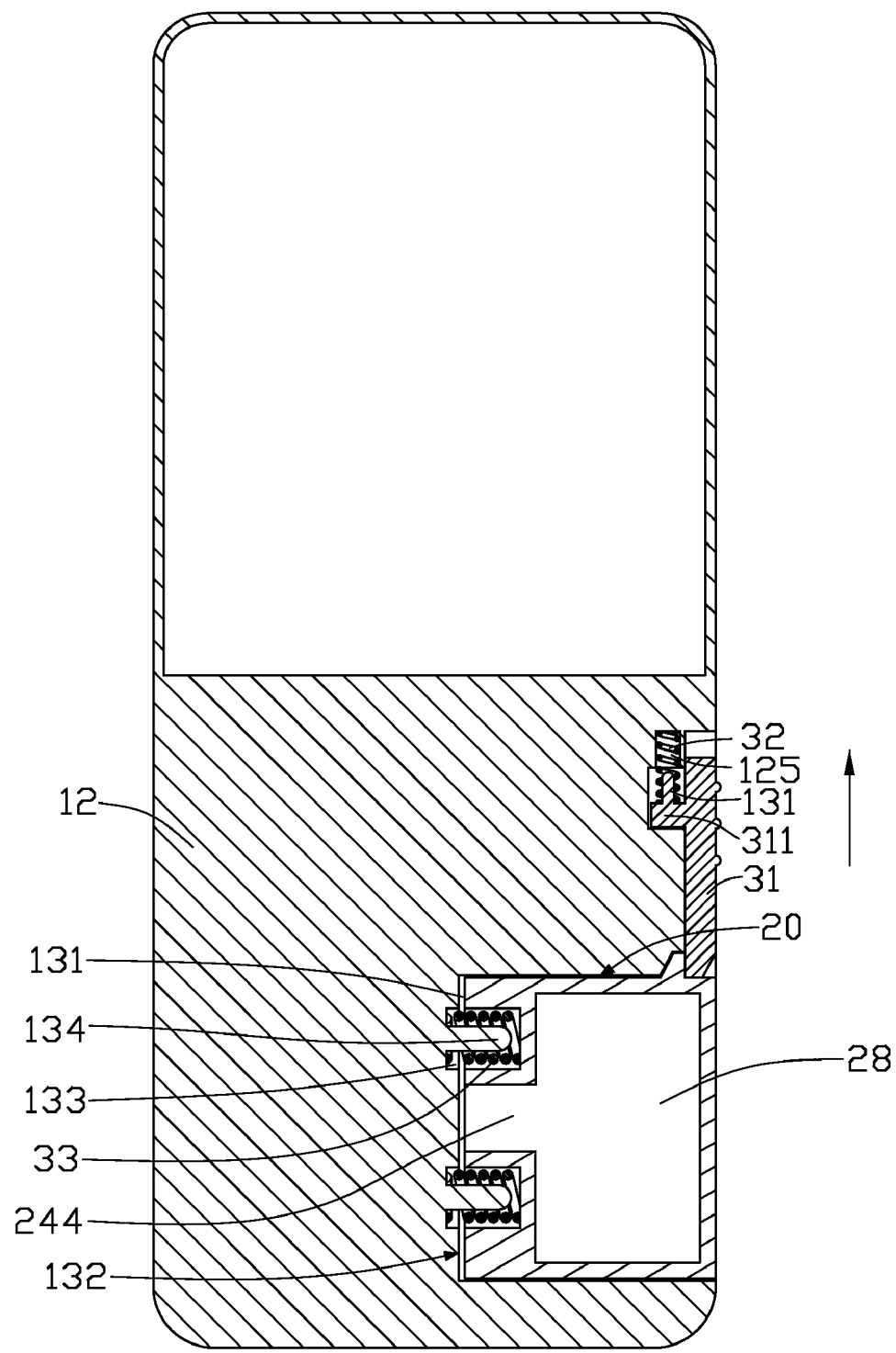
FIG. 6 is an enlarged, partially cut-away view of the portable electronic device shown in FIG. 2.

The speaker box 22 is substantially rectangular in shape, and has a top panel 23 defining a round opening (not labeled) for integrating the speaker unit 21 therein, a bottom panel (not labeled) located on the opposite side of the top panel 23, a first sidewall 24, a second sidewall 26, and a resonant chamber 28 (as shown in FIG. 6) defined therein. The second sidewall 26 is adjacent to and is oriented substantially perpendicular to the first sidewall 24. Two guiding protrusions 222 extend respectively from the top panel 23 and the bottom panel and are adjacent to the first sidewall 24. The guiding protrusion 222 projecting from the top panel 23 is configured for being slidably engaging in the second guiding slot of the cover 14, and the guiding protrusion 222 projecting from the bottom panel is configured for being slidably engaging in the first guiding slot 135 of the housing 12, thereby enabling the speaker device 20 to selectably slide inwards or outwards relative to the main body 10. The first sidewall 24 defines two positioning notches 242, and a through opening 244 therein. Each positioning notch 242 is recessed from an outer surface of the first sidewall 24 to an inner surface thereof, but does not penetrate therethrough. The through opening 244 is configured to penetrate the sidewall 24 to communicate with the resonant chamber 28, so that when the speaker device 20 is situated inside the main body 10, the resonant chamber 28 of the speaker device 20 communicates with the cavity 131 of the main body 10 via the through opening 244. A positioning block 262 is formed on one end (i.e., directly extending therefrom, either molded as part of the given second sidewall 26 or attached directly thereto) of the second sidewall 26 and is located far away (i.e., nearly diametrically opposed) from the first sidewall 24. The positioning block 262 is configured for being receivable in the cutout 128 of the main body 10 and is configured to serve as positioning stop member, via which the speaker device 20 can be held within the cavity 131.

Figure 5:
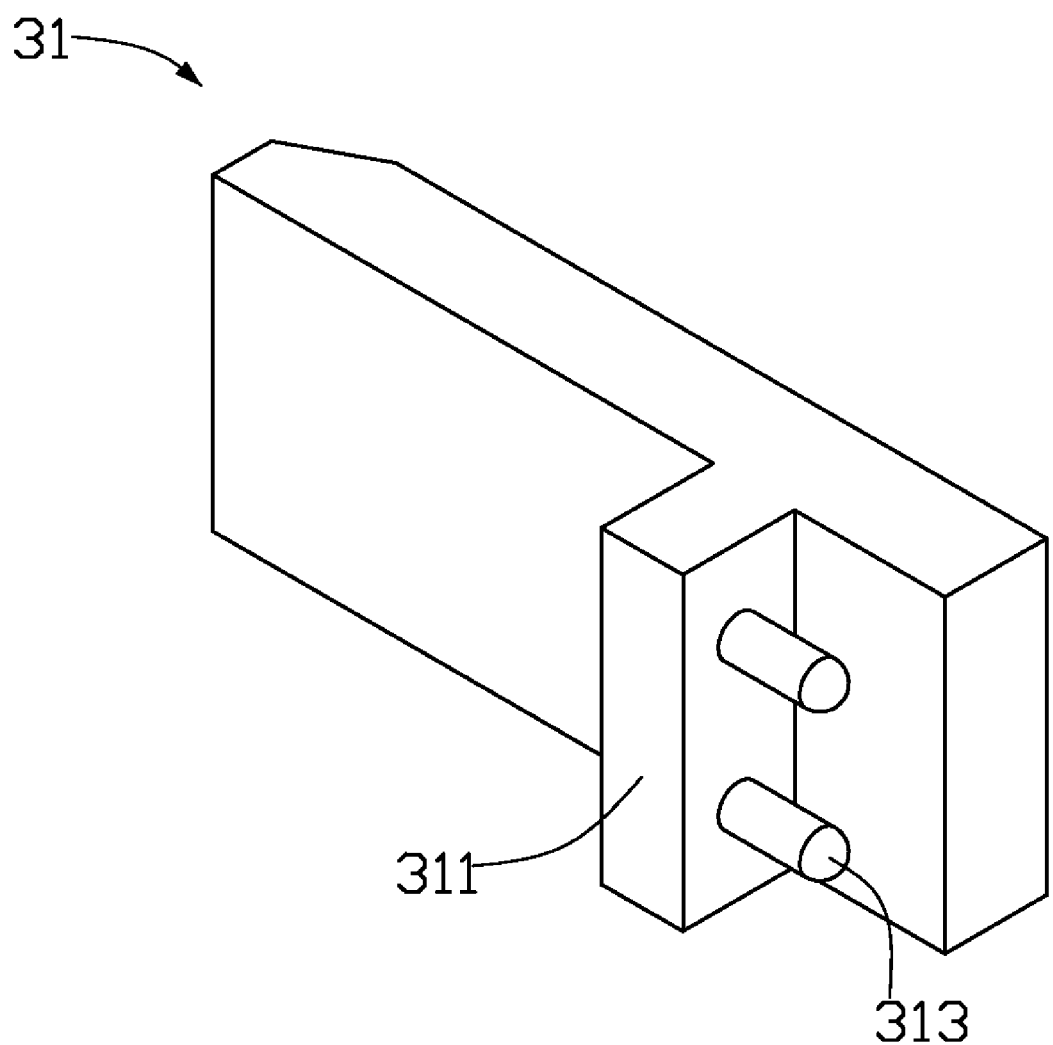
FIG. 5 shows an enlarged, isometric view of a latch body of a latching mechanism of the portable electronic device, but viewed from another aspect.

Also referring to FIG. 5, the latching mechanism 30 includes a latching body 31, a pair of latch-driving first elastic members 32, and a pair of second elastic members 33. The latching body 31 is substantially rectangular in shape and is configured for being receivable in the groove 122 of the main body 10. A guiding block 311 extends perpendicularly from a first side of the latching body 31. Two second poles 313 extend perpendicularly from the guiding block 311 and are substantially parallel to an extending direction of the latching body 31. An opposite second side of the latching body 31 is provided with a plurality of strip-shaped projections 315, each configured for facilitating operation of pulling the latching body 31. The first and second elastic members 32, 33 advantageously are made of metal material and are spiral-shaped (i.e., a coil spring). A first end of each first elastic member 32 is configured for wrapping/sliding around a corresponding second pole 313 in a manner such that the second pole 313 is matingly received (e.g., slidably fits) within the first end of a corresponding second elastic member 32. An opposite second end of each first elastic member 32 is configured for being matingly receivable in a corresponding positioning hole 125 of the main body 10. Each of the second elastic member 33 has a first end slidably mounted in a corresponding receiving hole 133, around a corresponding first pole 134 of the main body 10, and an opposite second end received in a corresponding positioning notch 242 of the speaker device 20.

Also referring to FIG. 6, in assembly, the first end of each second elastic member 33 is located in a corresponding receiving hole 133, and is placed around a corresponding first pole 134 of the housing 12. The speaker device 20 is inserted into the cavity 131, with the second end of each second elastic member 33 being received in a corresponding positioning notch 242, and the guiding protrusion 222 on the bottom panel of the speaker device 20 being slidably received in the first guiding slot 135 of the housing 12, until the positioning block 262 is received in the cutout 128 (i.e., now at a fully retracted position of the given speaker device 20). The second elastic members 33 are compressed. Then, the first end of each first elastic member 32 is placed around a corresponding second pole 313 of the latching body 31. The second end of each first elastic member 32 is inserted into a corresponding positioning hole 125 of the housing 12, and the latching body 31 is placed in the groove 122 of the housing 10, with the guiding block 311 being received in the slot 126. Each first elastic member 32 has its tension to push the latching body 31 to resist/abut against a near-corner portion of the sidewall 26 of the speaker box 22 along a longitudinal direction, thereby engaging with the speaker box 22 and also abutting the positioning block 262 (i.e., specifically abutting a side of the positioning block 262 facing the corresponding longitudinal side 120) in the cutout 128 along another direction orthogonal to the longitudinal direction. Such abutment thereby prevents the speaker device 20 from moving out of the cavity 131 (i.e., thus retaining the speaker device 20 therein), due to the tension (i.e., expansion) of the second elastic members 33. Finally, the cover 14 is mounted to the housing 12 in a manner such that the guiding protrusion 222 on the top panel 23 of the speaker device 20 is received in the second guiding slot of the cover 12, and the pore matrix 142 is positioned corresponding to the speaker unit 21 of the speaker device 20 for emitting sounds therethrough. Thus, the speaker device 20 is mounted into the main body 10 and held therein by the latching mechanisms 30, as shown in FIGS. 2 and 6.

In use, the latching body 31 of the latching mechanism 30 is operatively to be moved along the longitudinal direction so as to be disengaged away from the speaker device 20, as shown in FIG. 1, by manually pushing the projections 315 of the latching body 31. The first elastic member 32 is further compressed and the latching body 31 disengages from the positioning block 262. Then, the speaker device 20 is automatically pushed out of the cavity 131 due to the decompression of the second elastic members 33. The cavity 131 of the main body 10 and the resonant chamber 28 communicates with each other thereby composing a resonant chamber with a larger volume. Accordingly, the bass performance of the portable electronic device 100 can be improved by having a larger resonant chamber. When the enhanced bass performance of the speaker device 20 is not required, the user may push the speaker device 20 back into the cavity 131, simultaneously a tapered edge of the positioning block 262 slides through over a tapered end 316 of the latching body 31 and the second elastic members 33 are compressed so the physical relation between the latching mechanism 30 and the speaker device 20 retracts from FIG. 1 to FIG. 2. Once the speaker device 20 is in place within the cavity 131, the latching body 31 is released and is automatically moved towards the speaker device 20, under the decompression of the first elastic members 31, to resist the positioning block 262. Thus, the speaker device 20 is held in the main body 10 as shown in FIG. 2. It is to be understood, though the speaker device 20 is held in the main body 10, the speaker device 20 can emit sounds through the pore matrix 142. However, the bass performance of the speaker device 20 held in the main body 10 is not as good as the bass performance of the speaker device 20 exposed out of the main body 10.

Figure 7:
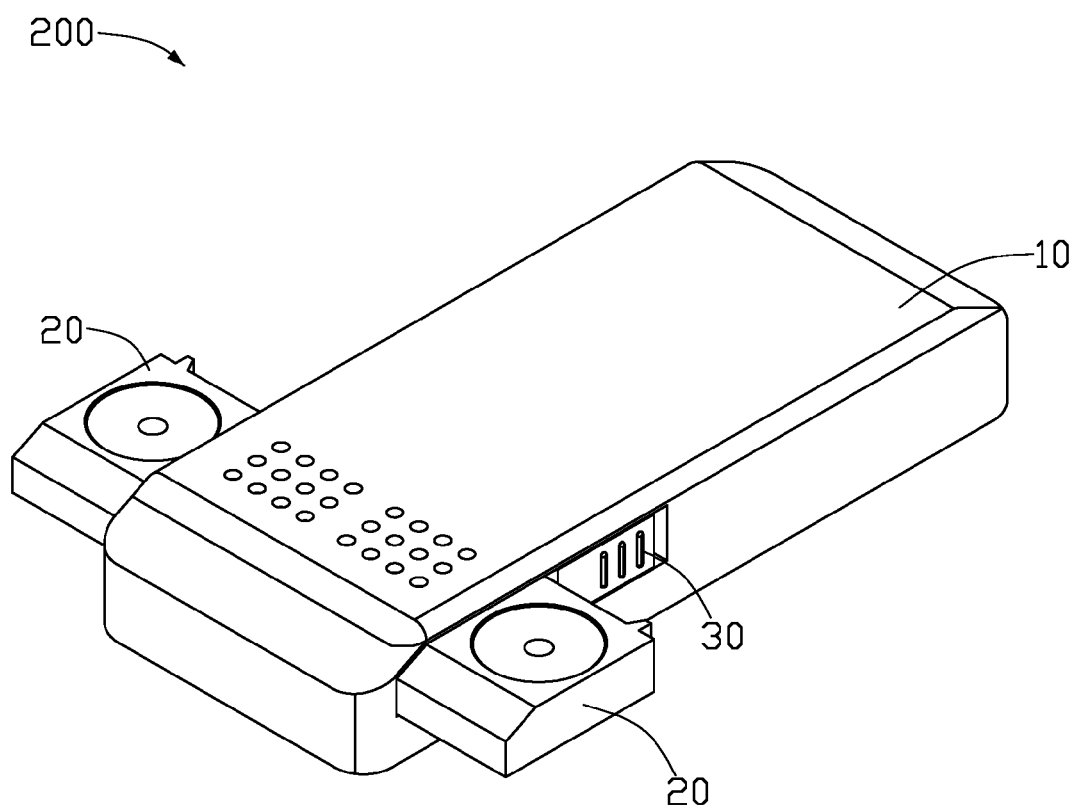
FIG. 7 shows another preferred embodiment of the portable electronic device, wherein a pair of movable speakers device are incorporated thereto.

It is to be further understood, another movable speaker device 20 can be mounted in an opposite longitudinal side of the main body 10, as shown in FIG. 7. Under this circumstance, the user can listen music with dimensional sounds (i.e., in stereo) through two speaker devices 20. Furthermore, the number of the speaker device 20 may be three or more.

Furthermore, the positioning block 262 may be another positioning stop member, such as a hole defined in the second sidewall 26 of the speaker box 22, and correspondingly, one end of the latching body 31 can be configured to be receivable in the hole so as to hold the speaker device 20 in the main body 10. The first and second elastic members 32, 33 may alternatively be made of materials other than metal (e.g., plastic or rubber) and may alternatively have a different configuration, for example, a leaf spring, or an elastic/elastomeric cylinder.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
    a main body having at least one cavity and one groove defined therein;
    at least one speaker device being movable received in the cavity of the main body, and comprising a resonant chamber defined therein communicating with the cavity of the main body and a positioning stop member extending therefrom; and
    at least one latching mechanism movably attached to the main body and having a latching body and at least one latch-driving member, the latching body having a guiding block extending perpendicularly therefrom and inwardly toward the main body, the main body defining a slot communicating with the groove for receiving the guiding block and a step is formed in the main body, the at least one latch-driving member having a first end resisting the latching body, and a second end resisting against the main body, the step defines a positioning hole therein configured for receiving the second end of the latch-driving member, causing the at least one latching body to selectively engage with the positioning stop member to control movement of the speaker device relative to the main body.

2. The portable electronic device as claimed in claim 1, wherein the speaker device comprises a speaker box substantially rectangular in shape and having a first side wall and a speaker unit received in the speaker box, the positioning stop member is formed on the first sidewall of the speaker box, the main body includes a longitudinal side, and the cavity recesses into the main body via the longitudinal side.

3. The portable electronic device as claimed in claim 2, wherein the speaker box further has a second sidewall adjacent to and oriented substantially perpendicularly to the first sidewall, the latching mechanism further comprises a speaker-driving elastic member, the main body further includes an inner wall facing the cavity, a first end of the speaker-driving elastic member resists the inner wall of the main body, and a second opposite end of the speaker-driving elastic member resists the second sidewall of the speaker.

4. The portable electronic device as claimed in claim 3, wherein a pole extends from the inner wall of the main body into the cavity of the main body, and the speaker-driving elastic member fits around the pole.

5. The portable electronic device as claimed in claim 3, wherein the second sidewall of the speaker box defines a positioning notch therein configured for receiving the second end of the speaker-driving elastic member.

6. The portable electronic device as claimed in claim 2, wherein the main body defines the groove therein adjacent to the cavity of the main body, the groove being configured for receiving the latching body of the latching mechanism.

7. The portable electronic device as claimed in claim 1, wherein a pole extends perpendicularly from the guiding block, and the first end of the latch-driving member fits around the pole of the latching body.

8. The portable electronic device as claimed in claim 1, wherein the at least one latch-driving member is configured for biasing the latching body toward the speaker device.

9. The portable electronic device as claimed in claim 8, wherein, when the speaker device is retracted into the main body, the latching body is operative to be engaged with the positioning stop member in a manner that retains the speaker device within the main body.

10. The portable electronic device as claimed in claim 6, wherein the main body defines a cutout therein configured for receiving the positioning stop member, and the cutout communicates with the groove of the main body.

* * * * *